US 8,584,559 B2

(12) United States Patent
Geiser (10) Patent No.: US 8,584,559 B2
(45) Date of Patent: Nov. 19, 2013

(54) AUTOMATIC UNIVERSAL WORKPIECE FEED AND UNLOADING DEVICE FOR MACHINE TOOL

(75) Inventor: Marc S. Geiser, Goldlauter (DE)

(73) Assignee: Samsys GmbH, Zella-Mehlis (DE)

( * ) Notice: Subject to any disclaimer, the term of this patent is extended or adjusted under 35 U.S.C. 154(b) by 1258 days.

(21) Appl. No.: 12/230,990

(22) Filed: Sep. 9, 2008

(65) Prior Publication Data

US 2009/0064830 A1    Mar. 12, 2009

(30) Foreign Application Priority Data

Sep. 10, 2007  (EP) ..................................... 07405274

(51) Int. Cl.
*B23B 13/00* (2006.01)
(52) U.S. Cl.
USPC .................................. 82/124; 82/125; 82/127
(58) Field of Classification Search
USPC .................................. 82/124–127; 414/14–18
See application file for complete search history.

(56) References Cited

U.S. PATENT DOCUMENTS

| | | | | |
|---|---|---|---|---|
| 4,048,879 A | * | 9/1977 | Cox | ................................. 82/142 |
| 5,890,407 A | * | 4/1999 | Drei | ................................. 82/126 |
| 6,446,533 B2 | * | 9/2002 | Miyano | ........................... 82/127 |
| 6,871,389 B2 | * | 3/2005 | Cheng | ........................... 29/38 D |
| 2005/0076756 A1 | * | 4/2005 | Andonegui Milicua | ......... 82/124 |

FOREIGN PATENT DOCUMENTS

| | | |
|---|---|---|
| AT | 402 616 | 7/1997 |
| EP | 0 900 612 | 3/1999 |
| WO | WO-92/12915 | 8/1992 |

* cited by examiner

*Primary Examiner* — Andrea Wellington
*Assistant Examiner* — Sara Addisu
(74) *Attorney, Agent, or Firm* — Foley & Lardner LLP (57) ABSTRACT

The device for automatically feeding blanks or half-finished workpieces to a machine tool, more particularly a CNC lathe, and automatically unloading the machined workpieces is composed of a gantry loader having an integrated feeder device that allows loading bars into the rear of the spindle of the lathe, thereby constituting a universal automatic feeding device. Furthermore, the latter more particularly allows a controlled removal of the bar end after all workpieces have been machined from a respective bar.

5 Claims, 7 Drawing Sheets

AUTOMATIC UNIVERSAL WORKPIECE FEED AND UNLOADING DEVICE FOR MACHINE TOOL

The present invention relates to a device for automatically feeding blanks or half-finished workpieces to a machine tool, more particularly a CNC lathe, and automatically unloading the machined workpieces and to a method for the operation of such a device.

Besides robots, which are mainly used for production processes in very large series on machine tools having multiple stations (transfer machines), two types of automatic devices for feeding (or loading, according to yet another common terminology) blanks or half-finished workpieces that are intended to the machined to a machine tool and/or unloading the machined workpieces can be distinguished, namely gantry loaders and the devices that are known as magazine bar feeders.

Bar feeders, e.g. of the kind designed by the inventor of the present invention and described in EP-0 900 612, are arranged at the rear of the headstock or the spindle of the lathe. They have been on the market for about fifty years now and are used for machining bars whose access to the machining area in front of the spindle is excluded due to their length (on the average, in most CNC lathes, this accessible machining area extends on a length of the order of 3.0 m to 6.0 m whereas so-called short bars measure between about 1 and 1.50 m). Although these feeders allow an automated supply of lathes with bars of this kind, they nevertheless suffer from significant disadvantages. The first, major disadvantage relates to the bar remainders (bar ends). In fact, to obtain machined workpieces of high precision, any floating of the bar has to be prevented, which implies the necessity of a precise guidance of the bar in the spindle of the lathe. This guidance is ensured by at least one reducing element (tube or sleeve) that is introduced into the spindle of the lathe and whose bore corresponds to the diameter of the stock, i.e. of the bar, which however makes it impossible to seize the bar end, i.e. to extract the latter through the rear of the spindle. Therefore, the bar ends are always ejected frontally, in the machining area of the lathe, into the chip conveyor. However, these bar ends may easily attain 5 kg or even more and their fall may cause damages not only to the conveyor but also to all parts located in the line of fall. This serious disadvantage is further amplified when considering modern lathes having at least four axes where a tool turret may be located directly underneath the machining area, i.e. in the line of fall. It is understood that the use of a feeder of the mentioned kind appears to be critical or even practically incompatible with a multi-turret lathe. The second, maybe less serious but still quite disturbing disadvantage is the fact that the machined workpieces are recovered in bulk rather than being automatically placed in a controlled manner in a desired position in a storage area or on a test bench for an inspection that is indispensable especially for high precision parts.

Gantry loaders are used for automatically feeding blanks or half-finished workpieces other than the bars mentioned above with regard to the feeders, i.e. chucking parts, shafts whose length is mostly comprised in a range of from 250 mm to 500 mm, and cast parts, and for automatically unloading such pieces after machining. They have appeared on the market about twenty years ago, and although they are free from the disadvantages mentioned with regard to bar feeders, they do not allow an automatic supply of lathes or other machining centers with bars through the spindle. And in addition to the impossibility of an automated supply of the lathe with bars, it appears that even a manual supply with pieces of this type (bars) may be impossible due to the fact that the gantry loaders, which are anchored to the ground in almost every case, prohibit any access to the rear of the spindle.

Thus, for decades, the manufacturers of pieces, mainly subcontractors, have been confronted in each purchase of an automatic feed device with a problem whose significance is increasing to such an extent that it may hinder the development or the growth of an enterprise today. As a matter of fact, these manufacturers generally do not know what they will manufacture in the future: continuity in the kind of hitherto performed machining operations (e.g. machining of bars) or, on the contrary, necessary adaptations to the market (involving e.g. the machining of chucked and cast parts instead of or complementarily to the machining of bars). Today, in any case, they have to be capable of adapting to every possibility on short notice, while the purchase of one of the two types of automatic devices will allow machining e.g. chucked and cast parts but not bars, and vice versa, unless substantially increasing the financial investment by purchasing at least one device of each type. Moreover, a twofold development both of the market and of the machine tools dictates an increasing conversion frequency and requires the manufacturers' ability to perform increasingly complex machining operations on workpieces that involve the use of polyvalent machine tools provided with multiple turrets and machining axes.

It is the object of the present invention to solve this problem and concomitantly to overcome the disadvantages of the two types of devices discussed above—bar feeders and loading/unloading gantry loaders—the solution being provided by a device for automatically feeding blanks or half-finished workpieces to a machine tool, more particularly a CNC lathe, and automatically unloading the machined workpieces, including a frame supporting a workpiece loading/unloading device that is capable of successively or simultaneously moving at least in a vertical Z axis and a horizontal X axis in order to introduce a workpiece that is to be machined through a machining space in front of the lathe and to extract the workpiece from this space after machining, a workpiece magazine, and a trash bin for residual material or remainders, wherein the device comprises an integrated feeder device that allows loading bars through the rear into the spindle of the lathe, the magazine allowing to receive at least one bar to be machined.

A method for the operation of such a device comprises the step that the loading/unloading beam is actuated every time a bar has been completely machined in order to recover the bar end in the machining space and to transfer it to the trash bin for residual material and rejects.

These means render the loading/unloading device a tool of optimum flexibility that is truly universal by allowing at least one of:

an automatic supply of chucking parts, shafts, and cast parts through the machining space, i.e. by the introduction of such pieces from the front side into the mandrels or collets of the machine tools, an automatic delivery of bars from the rear and through the spindle of the machine tools, controlled unloading of all these workpieces after the machining operations (storage or warehousing and possible inspection of the tolerances of the machining measurements), a recovery of the bar remainders (end portions of the bars) out of the machining zone of the lathe when the latter is used for machining bars, a conversion in a minimum of time for changing between the treatment of pieces of a given kind (e.g. cast parts) and the treatment of pieces of another kind (e.g. bars), the possibility, when a double spindle lathe is used, of simultaneously machining a bar that is transferred in the left chuck and has been fed from the rear through the left-hand spindle and another workpiece (chucked part, shaft, or cast part) that is chucked in the right-hand mandrel and has been fed from the front side through the machining space, all this at minimum costs.

An exemplary preferred embodiment of the loading/unloading device of the invention will now be described with reference to the attached drawings, in which.

Figure 1A:
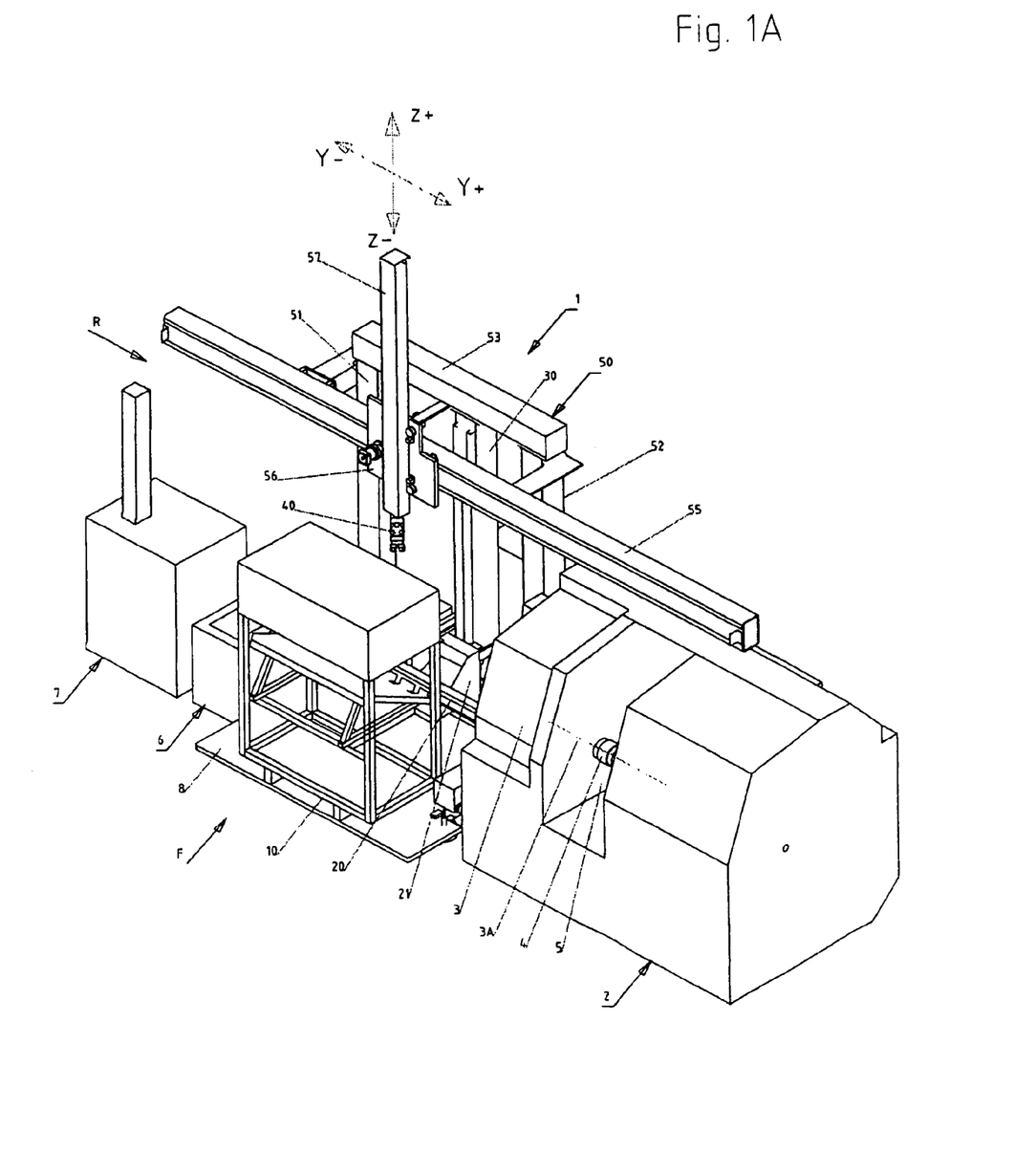
FIG. 1A shows a schematic perspective view of the device.

The automatic workpiece loading/unloading device 1, hereinafter called universal device, is illustrated in the schematic views of FIGS. 1A, 1B (perspective views), 2 and 3 (front and side views, respectively, according to arrows F and R in FIG. 1A). It is essentially arranged rearwardly of a machining center, in this case a lathe 2 of which machining space 5 is visible and, within the latter, a mandrel 4 in the prolongation of a headstock or spindle 3 having an axis 3A.

Universal device 1 comprises an automatic loading/unloading gantry loader 50 having an integrated bar feed device 20 as well as a removable specific or polyvalent magazine 10, i.e. that is intended for blanks and half-finished workpieces of different kinds that are to be machined and/or for machined workpieces. In this example, magazine 10 is of the polyvalent type in that it may contain bars, on one hand, and on the other hand, other workpieces such as chucking parts and/or cast parts and/or shafts. Universal device 1 further comprises auxiliary elements, namely a trash bin 6 for residues and rejects and an inspection and measuring block 7.

Gantry loader 50 has a frame composed of two vertical beams 51, 52 whose upper ends are connected by a horizontal beam 53 to form an inverse U, each one of the vertical beams being supported on a base formed of a beam 54 extending orthogonally to the horizontal beam. On one hand, on its upper part, this frame supports a guide beam 55 along which a carriage 56 is displaceable in an Y axis (directions Y+, Y−) and to which a beam 57 is connected that is vertically displaceable in a Z axis (directions Z+, Z−) and to the lower end of which a polyvalent head 40 is affixed. On the other hand, to the horizontal beam 53 of the frame, between the vertical beams of the inverse U, a guide beam 30 is affixed at the upper and lower parts of which a motor 31 and a carriage 21 are arranged, respectively, which are connected to one another by a means for movement transmission 32 accommodated in beam 30, in the present example a screw actuated by motor 31, so as to make carriage 21 vertically displaceable in an axis W (directions W+, W−) on a given distance. In a variant, beam 30 may be omitted and all the aforementioned elements connected thereto may be connected to either one of beams 51, 52. In a variant, the gantry loader may be designed such that beam 55 and thus beam 57 are capable of an additional movement in a non-represented horizontal axis that is orthogonal to axes Y and Z.

Figure 3:
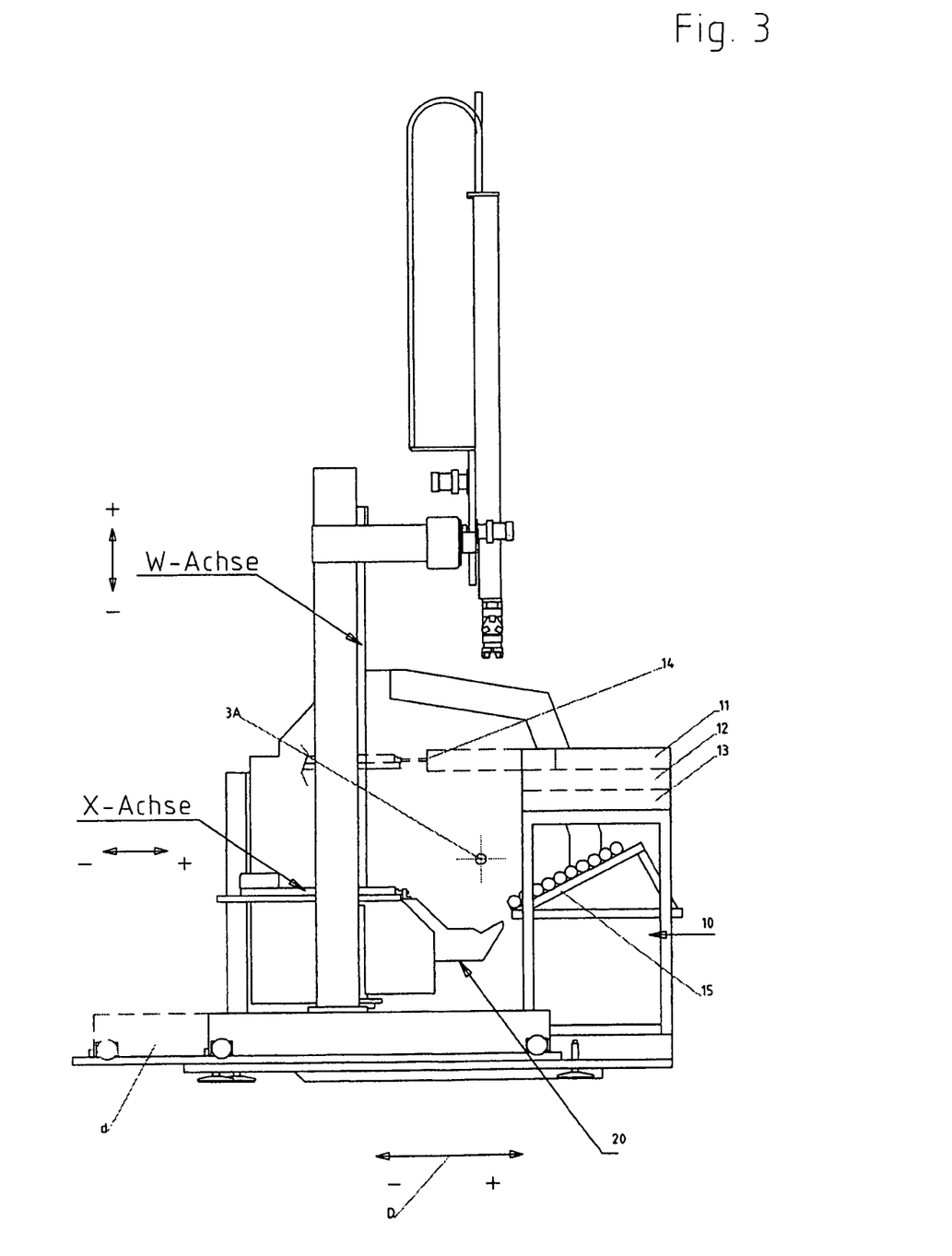
FIG. 3 shows a side view of the device according to arrow R in FIG. 1A.

The frame and thus the elements supported thereon are preferably displaceable laterally on a platform 8, i.e. orthogonally to axis 3A of the spindle of the lathe, on a determined limited distance d (arrows D+, D− in FIG. 3).

Figure 7:
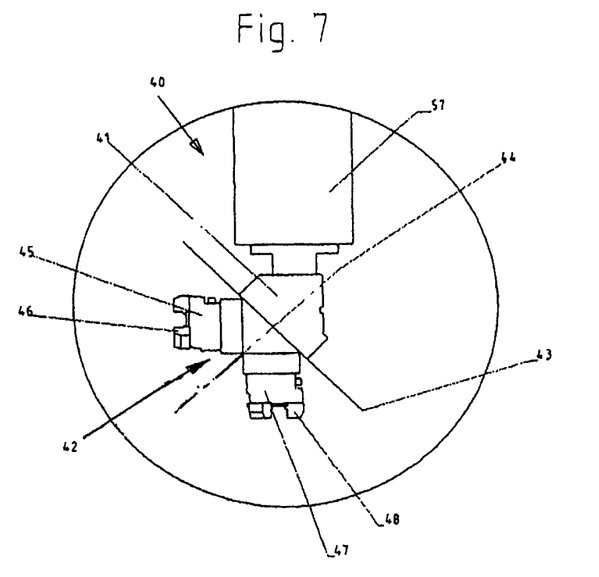
FIG. 7 shows a polyvalent workpiece loading and unloading head.

An example of a polyvalent head 40 arranged at the lower end portion of beam 57 is illustrated in FIG. 7. This head comprises a base 41 and a turret 42. The turret is mounted on the base in a plane 43 that is inclined by 45° and slidable about an axis 44. Turret 42 comprises two grippers 45, 47 having respective jaws 46, 48. Thus, by imparting a rotation of 180° to the turret from the position illustrated in FIG. 7, gripper 45 that has been in the horizontal position will take the vertical position of the other gripper 47 and vice versa. It is understood that other types of heads and turrets that are more specifically adapted to a given kind of workpieces (e.g. with a double gripper for loading/unloading shafts) can be realized by one skilled in the art.

Figure 5:
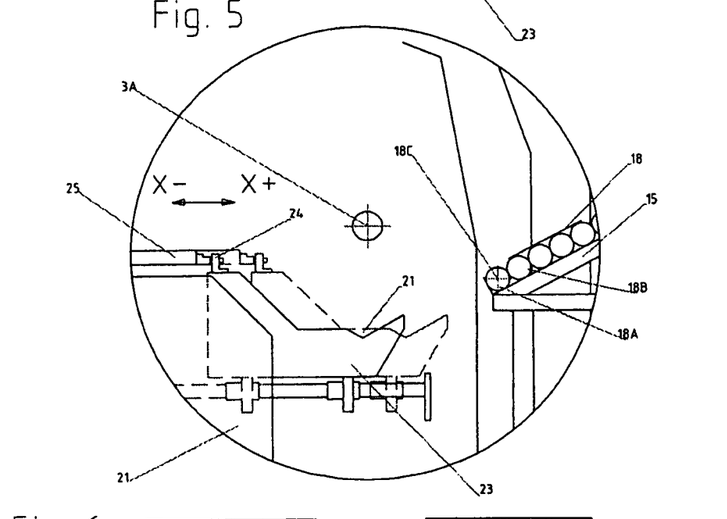
FIGS. 5 and 6 show details of FIG. 4.
Figure 6:
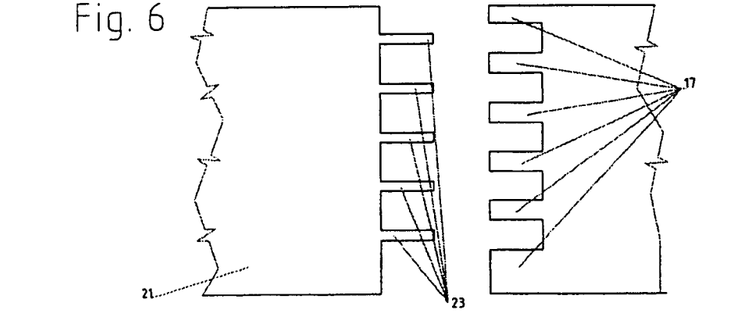

Opposite carriage 21, workpiece/machined workpiece magazine 10 is arranged. As indicated above, the illustrated magazine is of the polyvalent type and comprises in its upper section a series of drawers 11, 12, 13 in which workpieces (blanks or half-finished chucking parts, shafts, and/or cast parts, and/or machined chucking parts, shafts, and/or cast parts and parts machined from bars) can be placed. Each one of the drawers is provided with an actuating handle 14, each drawer being provided with a connecting means that is capable of cooperating with the second motor mean for opening and closing the drawer. In its lower section, i.e. underneath the above-mentioned drawers, at least one table 15 having an inclined plane (see FIGS. 3, 4 and 5) is located on which a series of bars 18 that are to be machined is lying, the first one 18A of the latter being retained by a shoulder 16 (or, in a non-represented variant, by retractable stops), the shoulder having slots 17 biting on the plane of the table (see FIG. 6).

Figure 1B:
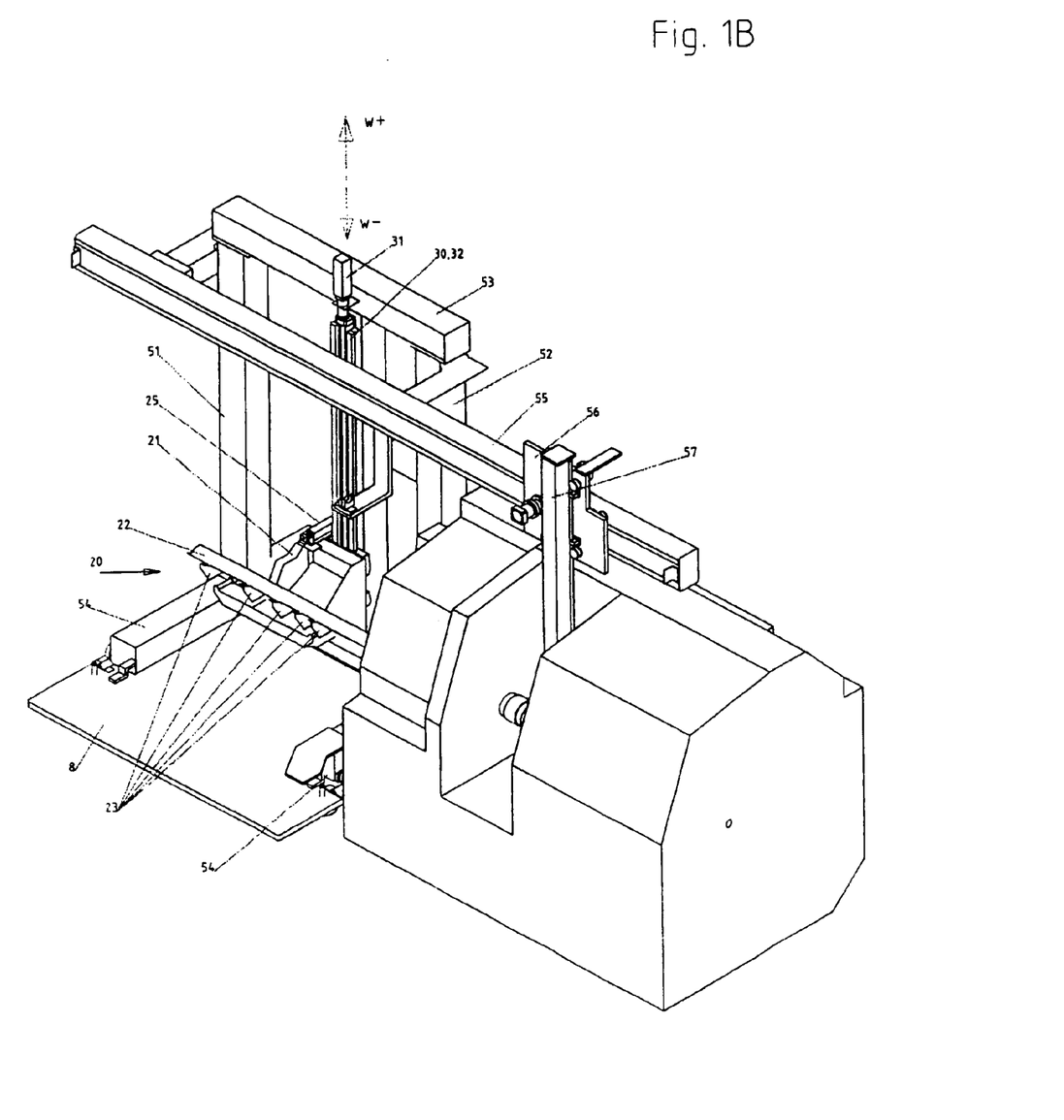
FIG. 1B shows a view similar to FIG. 1A with parts removed.
Figure 2:
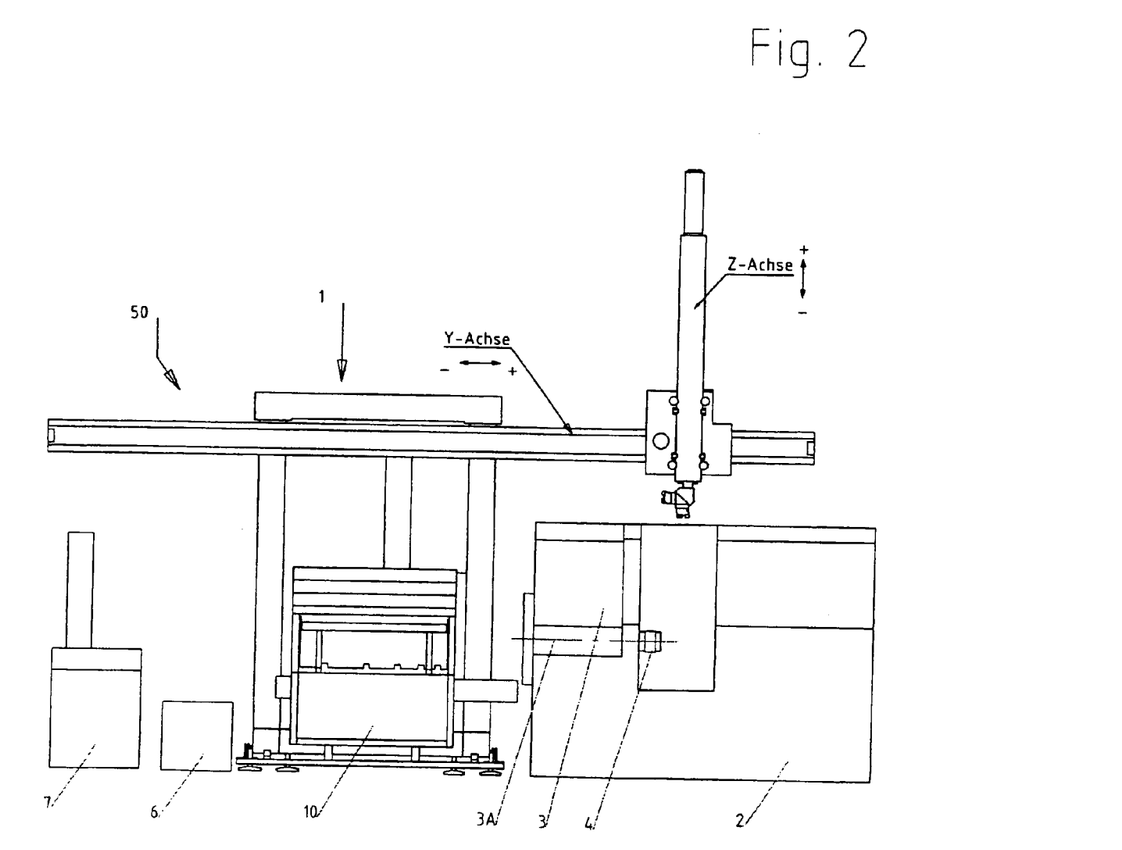
FIG. 2 shows a front view of the device according to arrow F in FIG. 1A.

A device 20 for feeding raw or half-finished bars 18 to the lathe, i.e. essentially an assembly of a V-shaped bench and a pusher that is analogous in its structure and operation to the device commonly called a bar feeder that is described in detail in EP-0 900 612, which has been mentioned in the introduction, symbolically represented here by V-shaped bench 22 in FIG. 1B where magazine 10 is removed, is connected to carriage 21. Claws 23 extend below bench V to which they are connected, these claws being arranged opposite slots 17 of the inclined table to let the latter pass below them. As mentioned above, carriage 21 and thus the assembly of carriage 21 and bench 22 is vertically displaceable along axis W under the action of motor 31 while the assembly of bench 22 and claws 23 is furthermore horizontally displaceable in an X axis (directions X+, X−) under the action of a motor 25 that can be engaged with bench 22 via an actuating handle 24 (FIGS. 1B, 3-5).

A cycle of machining a workpiece from a bar is as follows.

Figure 4:
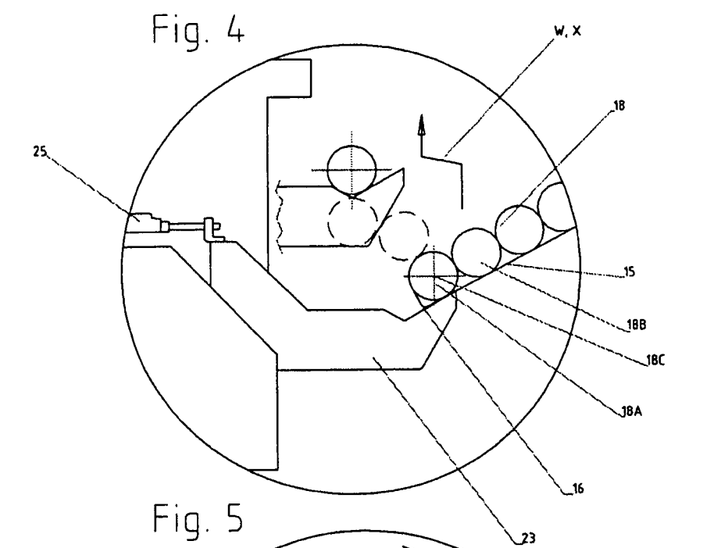
FIG. 4 shows a schematic view illustrating the transfer of a bar to be machined from an inclined plane of a bar feeder to the center of the spindle.

A first phase (see FIGS. 4 and 5) consists of transferring first bar 18A, i.e. the bar that is blocked by shoulder 16, from table 15 to bench 22 and to position it such that its axis 18C coincides with axis 3A (FIGS. 3 and 5) of spindle 3. This transfer is achieved by performing suitable movements along axes W (carriage and bench and claw assembly) and X (bench and claw assembly only) as it is schematically indicated in FIG. 4 while bar 18B is resting in a waiting position against shoulder 16.

A second phase consists of introducing the bar into the spindle by means of the pusher (not shown) according to a known process that is described in detail in the aforementioned EP-0 900 612 until it has reached its programmed position outside mandrel 4 in view of machining a first workpiece from bar 18A, and of subsequently proceeding with the machining operations which begin after the bar has been chucked in mandrel 4.

When machining is completed, a third phase consists of separating the machined workpiece from the remainder of the bar by applying one of the known and commonly used procedures, e.g. by parting and twisting, and to put that workpiece in storage in magazine 10, possibly after its passage on inspection and measuring bench 7.

Figure 8:
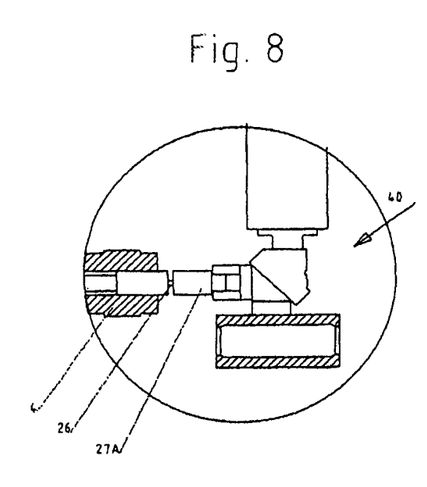
FIGS. 8 and 9 show the seizure, in the machining space, of a workpiece machined from a bar.
Figure 9:
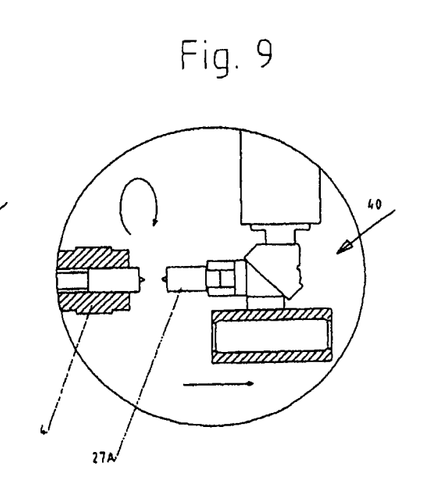

According to FIG. 8, after parting down to a thin strip of material (reference numeral 26), gripping the machined workpiece in a mandrel of turret 42 of polyvalent head 40 after an adequate positioning of the latter is followed by a rotation of mandrel 4 of the lathe to cause the rupture of the strip and achieve the release of machined workpiece 27A. After this, the latter can be transferred—by performing suitable movements in the Y and Z axes—directly or indirectly, i.e. after its passage on the inspection and measuring bench, to magazine 10 for storage in an ordered manner, unless a defect is discovered (e.g. the failure to meet a tolerance of a measurement), in which case the machined workpiece will be dropped into the trash bin (see FIG. 10, where it is assumed that machined workpiece 27A is inserted in a non-referenced pocket of a drawer 12).

Figure 11:
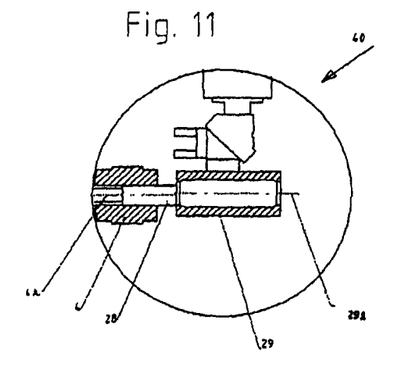
FIGS. 11, 12 and 13 show the process of recovering the remainder (bar end) after machining a bar, while it is noted that the representation scales are not uniform.
Figure 12:
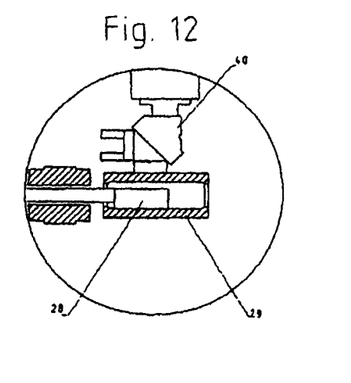
Figure 13:
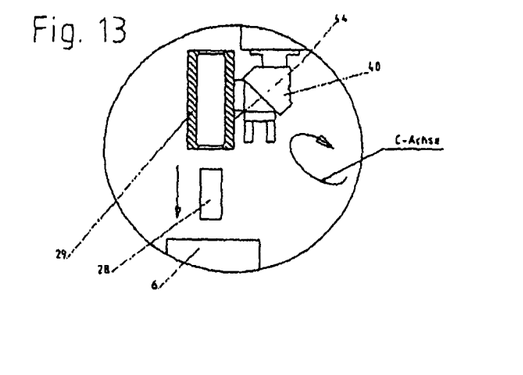

FIGS. 11, 12 and 13 show the sequence of operations for the recovery of a material remainder 28 (or bar end) left in mandrel 4 (axis 4A) of the lathe after the bar has been completely machined. To this end, head 40, one mandrel of which is equipped with a recovery tube 29 whose diameter is significantly larger than the bar diameter, is positioned opposite the bar remainder such that axis 29A coincides at least approximately with axis 4A of the mandrel 4. Then the bar end is extracted from mandrel 4 under the action of the (non-referenced) pusher (FIG. 12). The latter is retracted and brought into position for feeding a new bar to the spindle while tube 29 is positioned (by performing movements in the Y and Z axes) above recovery bin 6, into which it is emptied by rotating the turret about its axis 44 (see above and FIG. 13).

Figure 10:
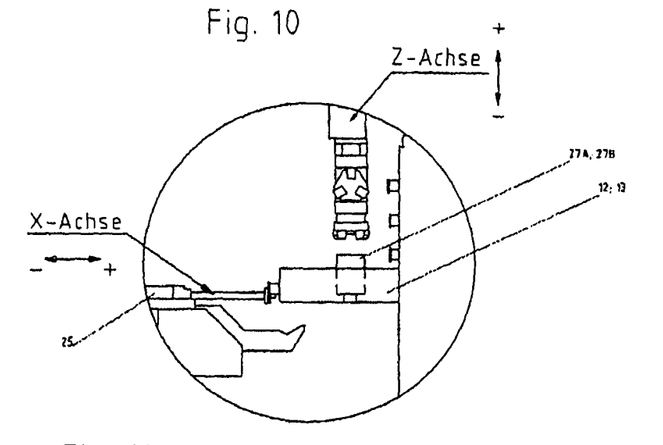
FIG. 10 shows the loading/unloading head in position above a workpiece that is to be seized and is to be machined or of a workpiece that has just been stored.

The supply of the lathe with workpieces other than bars (chucking parts, shafts, cast parts) and the removal of the latter after the end of the machining operations are achieved by a known procedure:

The workpieces to machined are stored in an ordered manner e.g. in pockets of suitable cross-sections (not shown) of the drawers (of which three are visible in FIG. 3 and four in FIG. 10, by way of examples) of magazine 10 that is positioned in a determined manner opposite the frame of the gantry loader. Referring to FIG. 10, where it is assumed that a drawer 13 (previously considered as drawer 12) contains workpieces 27B that are to be machined, it is seen that head 40 is positioned for gripping a defined one of the latter in order to transfer it to machining space 5 and to introduce it into mandrel 4 of the lathe. As soon as it is chucked and the loading and unloading arm has been removed from the machining area, workpiece 27B is machined. When the machining operations are completed, an inverse transfer takes place in the same way as set forth above in this respect. Here also, prior to its storage, the machined workpiece may be forwarded to the inspection and measuring bench.

It is understood that other phases may be performed, e.g. returning a workpiece in view of a second machining cycle (unmachined rear side, for example) by means of optional devices that are not illustrated.

In a general manner, all of the operations described above are advantageously performed under numerical control.

List of Reference Numerals
01 general reference of universal device
02 machining center/CNC lathe
03 spindle/headstock
03A axis of mandrel/spindle
04 mandrel/gripper
05 machining space
06 trash bin for residual material
07 inspection and measuring block
08 platform of frame
09 --
10 raw or half-finished and/or machined workpiece magazine
11 workpiece drawer
12 id.
13 id.
14 actuating handle
15 inclined table/plane
16 lower shoulder of table 15
17 slots in shoulder 16 biting on plane of table
18 bars
18A first bar
18B second bar
19 --
20 bar feed device/bar feeder
21 carriage
22 bench
23 claws
24 actuating handle
25 drive motor (X+, X− directions)
26 thin strip of material (parting)
27A machined workpiece
27B workpiece to be machined (chucking part)
28 residue
29 recovery tube
30 guide beam (W+, W−)
31 motor (actuation along W−)
32 screw
33-39: --
40 polyvalent head (loading/unloading)
41 base
42 turret
43 common inclined sliding plane
44 rotation axis (inclined by 45°)
45 mandrel
46 jaw of mandrel 44
47 mandrel
48 jaw of mandrel 47
49 --
50 gantry loader
51 vertical beam
52 id.
53 upper horizontal beam of inverse U
54 base beam
55 upper horizontal guide beam (Y)
56 carriage on beam 55 (Y displacement)
57 Z displacement beam

The invention claimed is:

1. A device for automatically feeding bars, blanks or half-finished workpieces to a machine tool, more particularly a computer numerical controlled (CNC) lathe, and automatically unloading the machined workpieces, comprising
- a frame supporting a workpiece loading/unloading device that is capable of successively or simultaneously moving at least in a vertical Z axis and a horizontal Y axis in order to introduce a workpiece that is to be machined through a machining space in front of the lathe and to extract the workpiece from this space after machining,
- a workpiece magazine,
- a trash bin for residual material or remainders, and
- an integrated bar feeder device that allows loading bars through the rear into the spindle of the lathe, the magazine allowing to receive at least one bar to be machined,
- wherein the integrated bar feeder device comprises a carriage to which a bench for receiving the bars is connected, said carriage and said bench being connected to a first motor so as to be vertically displaceable in a W axis, and
- wherein the bench is connected to a second motor so as to be furthermore horizontally displaceable autonomously in an X axis, and so as to allow automated loading and unloading of any blank or bar and a controlled recovery of any machined workpiece and of any residual material.

2. The automatic feeding device of claim 1, wherein the bench is a V-shaped bench with claws connected thereto.

3. The automatic feeding device of claim 2, wherein the at least one bar to be machined is disposed on a table of the magazine, the table having slots in its end portion to allow the passage of the claws so as to permit the transfer of a bar onto the bench.

4. The automatic feeding device of claim 1, wherein the at least one bar to be machined is positioned in the axis of the spindle of the lathe by performing movements in the X and W axes.

5. The automatic feeding device of claim 1, wherein the magazine comprises at least one drawer for the storage of workpieces that are to be machined and/or machined workpieces, each drawer is opened and closed by the second motor.

* * * * *